United States Patent
Kim (10) Patent No.: US 10,871,126 B2
(45) Date of Patent: Dec. 22, 2020

(54) ENGINE PISTON AND METHOD OF MANUFACTURING THE SAME

(71) Applicants: Hyundai Motor Company, Seoul (KR); Kia Motors Corporation, Seoul (KR)

(72) Inventor: Hak Soo Kim, Whasung-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 103 days.

(21) Appl. No.: 16/352,392

(22) Filed: Mar. 13, 2019

(65) Prior Publication Data
US 2020/0123997 A1     Apr. 23, 2020

(30) Foreign Application Priority Data
Oct. 19, 2018    (KR) .................. 10-2018-0125496

(51) Int. Cl.
    *F02F 3/00*        (2006.01)
    *F41B 11/642*    (2013.01)
    *B22F 3/10*       (2006.01)

(52) U.S. Cl.
    CPC .......... *F02F 3/0084* (2013.01); *B22F 3/1017* (2013.01); *F02F 3/0015* (2013.01);
(Continued)

(58) Field of Classification Search
    CPC .............. F02F 3/0084; F02F 3/0015; F02F 2003/0007; F02F 2200/00;
(Continued)

(56) References Cited

U.S. PATENT DOCUMENTS 1,953,109 A * 4/1934 Heron ................ F02F 3/18
                                            123/41.16
4,953,660 A * 9/1990 Jewell, Jr. ............ F01N 1/02
                                            181/266
(Continued)

FOREIGN PATENT DOCUMENTS

KR      10-0784992 B1    12/2007
KR      10-1510916 B1     4/2015
(Continued)

*Primary Examiner* — Lawrence Averick
(74) *Attorney, Agent, or Firm* — Morgan, Lewis & Bockius LLP (57) ABSTRACT

A method of manufacturing an engine piston may include performing upper-body formation for forming an upper body as an upper portion of a piston body by pressing a powder-type sintered material, performing lower-body formation for forming a lower body as a lower portion of the piston body by pressing a powder-type sintered material, performing bonding for forming the piston body by providing a brazing material between the upper body and the lower body and brazing the upper body and the lower body to each other while sintering a sintered material, performing machining for removing pores from the surface of the piston body by machining the surface, and performing heat treatment for forming a passive film by performing at least one of nitriding heat treatment or oxidation heat treatment on the surface of the piston body.

11 Claims, 4 Drawing Sheets

(52) U.S. Cl.
CPC ..... *F41B 11/642* (2013.01); *F02F 2003/0007* (2013.01); *F02F 2200/00* (2013.01)

(58) Field of Classification Search
CPC ............ F02F 2003/0038; F41B 11/642; B22F 3/1017; B22F 2999/00; B22F 2998/10; B22F 7/062; B22F 5/008; B22F 3/24; B22F 2003/248; B23K 35/3033; C22C 33/0264; C22C 38/60; C22C 38/22; C22C 38/04; C22C 19/002; C22C 19/03; C22C 9/05; C22C 9/06; C22C 9/10; C22C 30/02

See application file for complete search history.

(56) References Cited

U.S. PATENT DOCUMENTS

| | | | | |
|---|---|---|---|---|
| 6,112,642 | A * | 9/2000 | Jarrett | F02F 3/0015 92/186 |
| 8,074,617 | B2 * | 12/2011 | Grahle | F02F 3/20 123/193.6 |
| 8,485,088 | B2 * | 7/2013 | Feeser | B23P 15/10 92/186 |
| 8,950,375 | B2 * | 2/2015 | Grahle | F02F 3/003 123/193.6 |
| 9,856,820 | B2 * | 1/2018 | Menezes | F02F 3/003 |
| 2006/0207424 | A1 * | 9/2006 | Gaiser | F02F 3/003 92/222 |
| 2009/0194059 | A1 * | 8/2009 | Grahle | F02F 3/20 123/193.6 |
| 2009/0241769 | A1 * | 10/2009 | Feeser | F02F 3/22 92/186 |
| 2012/0024255 | A1 * | 2/2012 | Grahle | F02F 3/003 123/193.6 |
| 2012/0037115 | A1 * | 2/2012 | Schnaiter | F02F 3/003 123/193.6 |
| 2012/0080004 | A1 * | 4/2012 | Menezes | F02F 3/22 123/193.6 |

FOREIGN PATENT DOCUMENTS

| | | |
|---|---|---|
| KR | 10-2015-0056622 A | 5/2015 |
| WO | WO 2009079988 A1 | 7/2009 |
| WO | WO 2014047123 A1 | 3/2014 |

* cited by examiner

ENGINE PISTON AND METHOD OF MANUFACTURING THE SAME

CROSS-REFERENCE TO RELATED APPLICATION

The present application claims priority to Korean Patent Application No. 10-2018-0125496, filed on Oct. 19, 2018, the entire contents of which is incorporated herein for all purposes by this reference.

BACKGROUND OF THE INVENTION

Field of the Invention

The present invention relates to an engine piston and a method of manufacturing the same, and more particularly to an engine piston made of an iron-based powder and a method of manufacturing the same.

Description of Related Art

In general, an engine piston of a vehicle is made of an aluminum alloy material.

Because a diesel engine is of a self-ignition type, the combustion efficiency is increased in proportion to the temperature of the upper side of the piston, that is, the temperature of the head portion. However, because the aluminum alloy material has very high thermal conductivity, the piston is easily cooled, thus making it difficult to keep the temperature of the head portion high.

Therefore, a technology of changing the material of the piston from an aluminum alloy material to a steel material to raise the temperature of the piston head portion has been developed. However, even when a piston made of a steel material is used, the maximum temperature of the piston head portion is slightly higher than that of a piston head portion made of an aluminum alloy material, for example, 50 to 150° C. higher, and the surface of the piston is oxidized and is subject to cracking.

Therefore, there is the demand for a new kind of engine piston capable of further raising the temperature of a piston head portion while preventing the occurrence of cracks, and a method of manufacturing the same.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an engine piston, which has excellent fatigue strength and oxidation resistance while further raising the temperature of a piston head portion by improving a thermal insulation property, and a method of manufacturing the same.

In accordance with an aspect of the present invention, the above and other objects may be accomplished by the provision of a method of manufacturing an engine piston, the method including performing upper-body formation for forming an upper body as an upper portion of a piston body by pressing a powder-type sintered material, performing lower-body formation for forming a lower body as a lower portion of the piston body by pressing a powder-type sintered material, performing bonding for forming the piston body by providing a brazing material between the upper body and the lower body and brazing the upper body and the lower body to each other while sintering a sintered material, performing machining for removing pores from a surface of the piston body by machining the surface of the piston body, and performing heat treatment for forming a passive film by performing at least one of nitriding heat treatment or oxidation heat treatment on the surface of the piston body.

In the performing the heat treatment, the oxidation heat treatment may be performed after the nitriding heat treatment is performed on the surface of the piston body.

The sintered material may include 0.45 to 0.6 wt % of C, 1.3 to 1.7 wt % of Cr, 0.15 to 0.35 wt % of Mo, 0.25 to 0.40 wt % of Mn, 0.1 to 0.2 wt % of S, and a remainder of Fe and inevitable impurities.

The sintered material may include 0.5 to 0.8 wt % of C, 0.8 to 0.9 wt % of Mo, 0.25 to 0.40 wt % of Mn, 0.1 to 0.2 wt % of S, and a remainder of Fe and inevitable impurities.

The brazing material used in the performing the bonding may include 35 to 45 wt % of Cu, 5 to 30 wt % of one or more selected from the group consisting of Si, Mn, B, P, C and Fe, and a remainder of Ni.

In the performing the bonding, sintering and brazing may be performed at 1100 to 1170° C. for 20 to 40 minutes, and the upper body and the lower body may be cooled to room temperature at a rate of 0.8 to 1.2° C./s.

In the performing the bonding, the upper body and the lower body may be spaced from each other by 0.05 to 0.15 mm, and the brazing material may be provided between the upper body and the lower body.

In the performing the machining, the surface of the piston body may be machined to a depth of 0.1 to 0.2 mm.

In the performing the heat treatment, the passive film may be formed by performing oxidation heat treatment at 540 to 570° C. for 20 to 120 minutes. The passive film may include a first oxide layer, which may include $Fe_3O_4$ and is formed to have a thickness of 2 to 8 μm on the surface of the piston body.

In the performing the heat treatment, a nitride layer may be formed by performing nitriding heat treatment at 450 to 540° C. for 1 to 4 hours, and the passive film may be formed by performing oxidation heat treatment at 540 to 570° C. The passive film may include a nitride layer, which may include iron nitride and is formed to have a thickness of 4 to 20 μm on the surface of the piston body, and a second oxide layer, which may include $Fe_3O_4$ and is formed to have a thickness of 1 to 3 μm on the surface of the nitride layer.

In accordance with another aspect of the present invention, there is provided an engine piston including a piston body formed by sintering an upper body and a lower body, formed through compression molding of a powder, brazing the upper body and the lower body to each other simultaneously with the sintering, and machining a surface thereof to remove pores from the surface thereof, and a passive film formed on the surface of the piston body, the passive film including at least one of oxide or nitride.

The piston body may have a density of 6.9 to 7.3 g/cm³.

The piston body may have an internal porosity of 7.5 to 12%.

The passive film may include a first oxide layer, which may include $Fe_3O_4$ and is formed to have a thickness of 2 to 8 μm on the surface of the piston body.

The passive film may include a nitride layer, which may include iron nitride and is formed to have a thickness of 4 to 20 μm on the surface of the piston body.

The passive film may include a nitride layer, which may include iron nitride and is formed to have a thickness of 4 to 20 μm on the surface of the piston body, and a second oxide layer, which may include $Fe_3O_4$ and is formed to have a thickness of 1 to 3 μm on the surface of the nitride layer.

The powder forming the piston body may include 0.45 to 0.6 wt % of C, 1.3 to 1.7 wt % of Cr, 0.15 to 0.35 wt % of Mo, 0.25 to 0.40 wt % of Mn, 0.1 to 0.2 wt % of S, and a remainder of Fe and inevitable impurities.

The powder forming the piston body may include 0.5 to 0.8 wt % of C, 0.8 to 0.9 wt % of Mo, 0.25 to 0.40 wt % of Mn, 0.1 to 0.2 wt % of S, and a remainder of Fe and inevitable impurities.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The terminology used herein is for the purpose of describing various exemplary embodiments only and is not intended to be limiting of exemplary embodiments of the present invention. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms used herein, which include technical or scientific terms, have the same meanings as those generally appreciated by those skilled in the art. The terms, such as ones defined in common dictionaries, should be interpreted as having the same meanings as terms in the context of pertinent technology, and should not be interpreted as having ideal or excessively formal meanings unless clearly defined in the specification.

Hereinafter, an engine piston and a method of manufacturing the same according to an exemplary embodiment of the present invention will be described with reference to the accompanying drawings.

First, a method of manufacturing an engine piston according to an exemplary embodiment of the present invention will be described.

Figure 1:
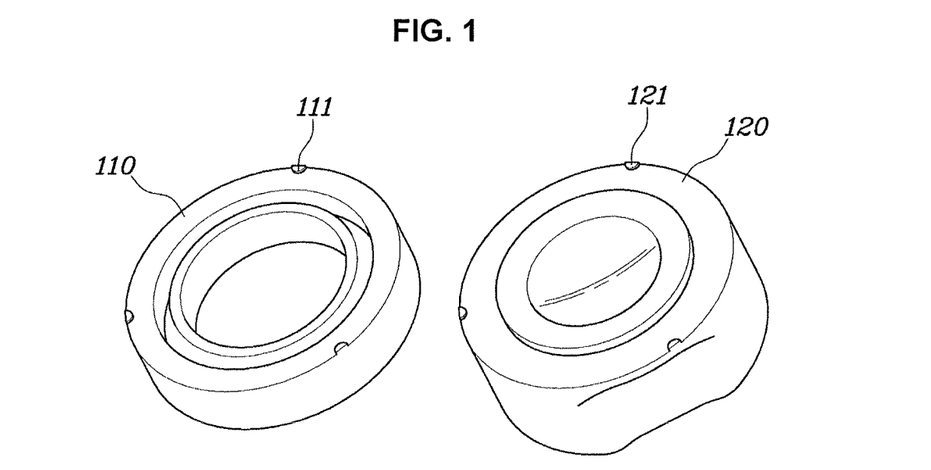
FIG. 1 is a perspective view of an upper body and a lower body according to an exemplary embodiment of the present invention.
Figure 2:
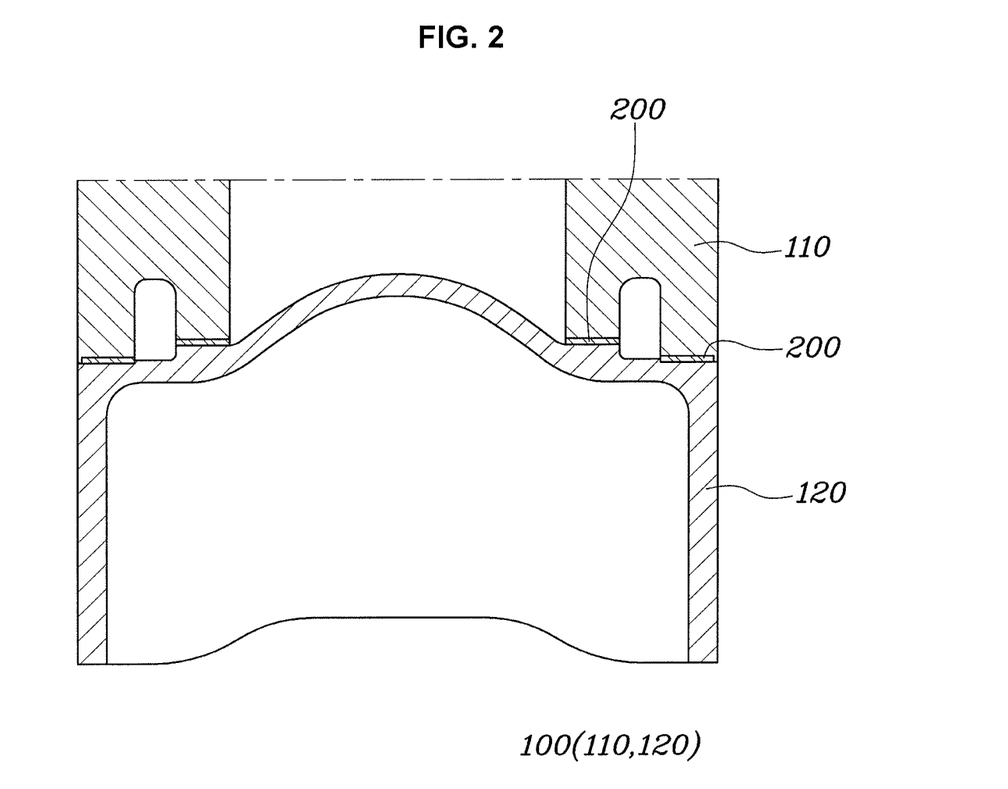
FIG. 2 is a cross-sectional view showing the state in which the upper body and the lower body are brazed to each other.
Figure 3:
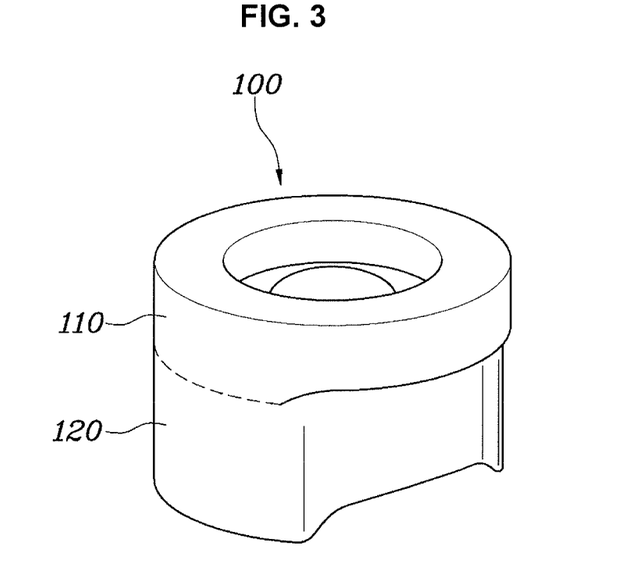
FIG. 3 is a perspective view showing a piston body formed through bonding of the upper body and the lower body.
Figure 4:
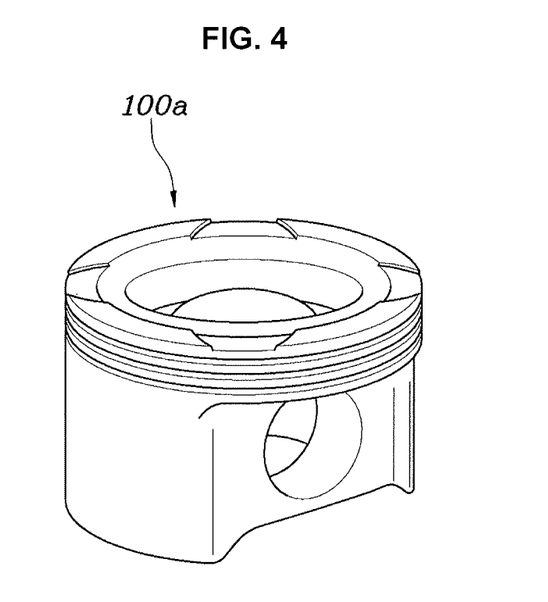
FIG. 4 is a perspective view showing a final piston product obtained by machining the piston body.
Figure 5:
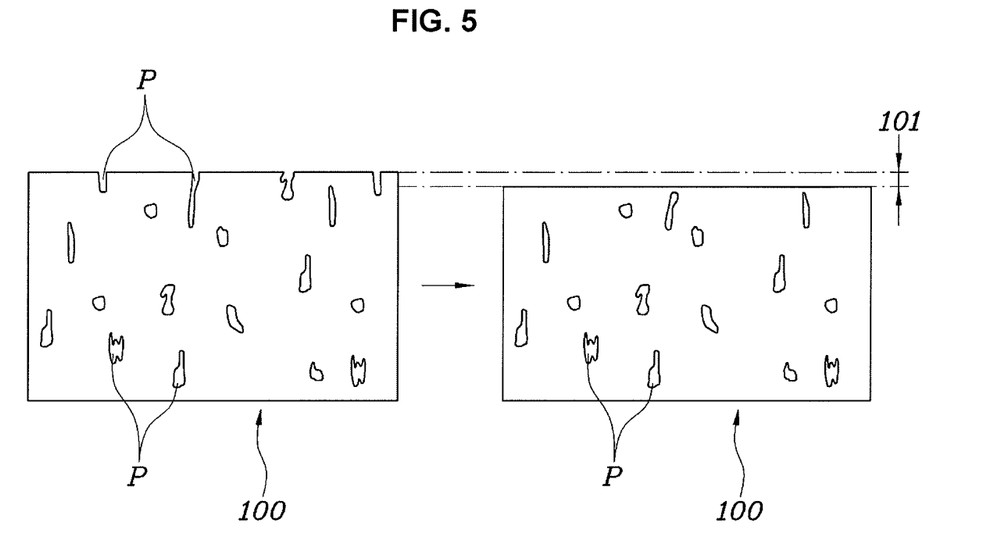
FIG. 5 is a schematic view showing the process of machining the surface of the piston body to remove pores from the surface of the piston body.
Figure 6:
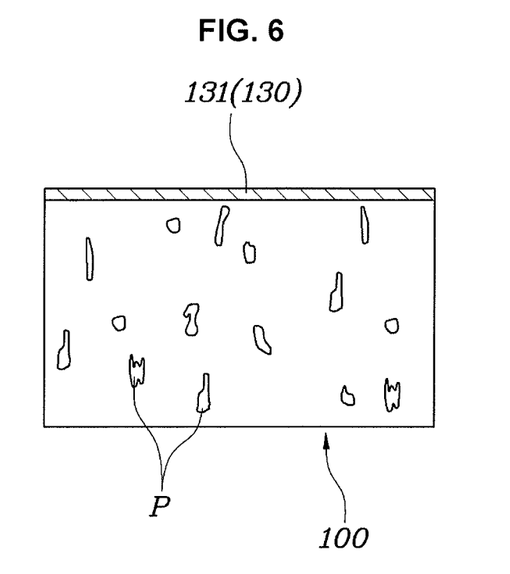
FIG. 6 and FIG. 7 are schematic view showing a passive film formed on the surface of the piston body.
Figure 7:
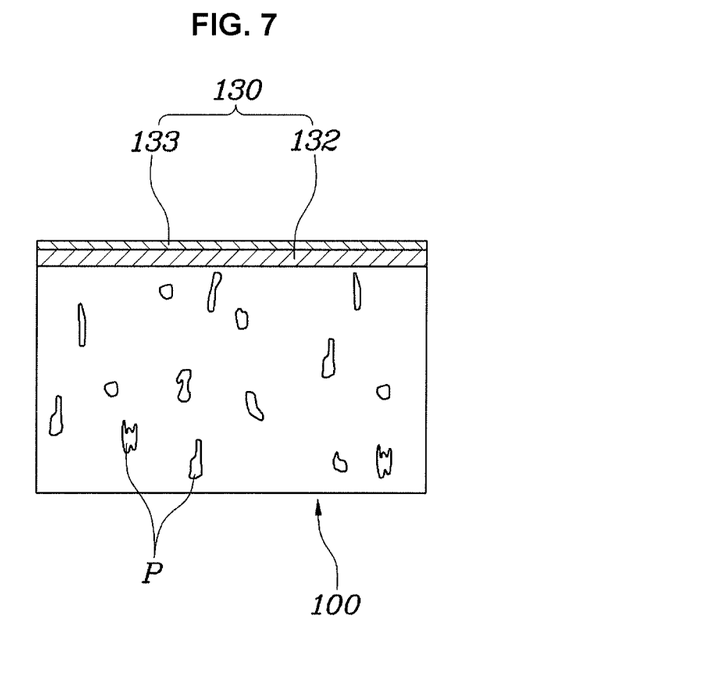

FIG. 1 is a perspective view of an upper body and a lower body according to an exemplary embodiment of the present invention, FIG. 2 is a cross-sectional view showing the state in which the upper body and the lower body are brazed to each other, FIG. 3 is a perspective view showing a piston body formed through bonding of the upper body and the lower body, FIG. 4 is a perspective view showing a final piston product obtained by machining the piston body, FIG. 5 is a schematic view showing the process of machining the surface of the piston body to remove pores from the surface of the piston body, and FIG. 6 and FIG. 7 are schematic view showing a passive film formed on the surface of the piston body.

As shown in FIGS. 1 to 7, an engine piston manufacturing method according to an exemplary embodiment of the present invention broadly includes an upper-body-forming step, a lower-body-forming step, a bonding step, a machining step and a heat treatment step.

As shown in FIGS. 1 to 4, the upper-body-forming step and the lower-body-forming step are steps of forming an upper body 110 and a lower body 120, which may form a piston body 100. The upper body 110 and the lower body 120 are formed through a compression molding method in which a powder-type sintered material is introduced into a mold and is then compressed.

The upper body 110 forms the upper portion of the piston body 100, and the lower body 120 forms the lower portion of the piston body 100. The upper body 110 and the lower body 120 are coupled to each other to form a single piston body 100.

The upper body 110 may be a crown portion of the piston body 100, and may have an insertion groove formed along the external circumferential surface thereof to receive a piston ring therein, and the lower body 120 may be a skirt portion of the piston body 100.

The reason for forming the piston body 100 through assembly of the upper body 110 and the lower body 120 is that it is difficult to form the overall shape of the piston body 100 by filling a single mold with a powder-type material due to the structure of the piston body 100. In other words, the piston body 100, which includes an undercut or a hollow region, cannot be formed through a general powder compression molding method, and is thus formed by assembling two separate parts.

The shapes of the upper body 110 and the lower body 120, formed in the upper-body-forming step and the lower-body-forming step, are not particularly limited. However, as described below, the sintered material forming the upper body 110 and the lower body 120 is a steel material to exhibit higher strength than the aluminum alloy used in the related art. Thus, the overall length of the piston body 100, which is formed through assembly of the upper body 110 and the lower body 120, that is, the length in the direction in which the piston body 100 ascends and descends within a liner, may be reduced in comparison with the overall length of a conventional piston made of an aluminum alloy material.

Accordingly, the length of the connecting rod may be increased, and thus the angle formed between the connecting rod and the longitudinal direction of the piston body 100 may be decreased. Furthermore, the lateral force applied to the piston body 100 may be decreased, and thus friction between the piston body 100 and the internal wall of the liner may be minimized.

The sintered material forming the upper body 110 and the lower body 120 may include 0.45 to 0.6 wt % of carbon (C), 1.3 to 1.7 wt % of chromium (Cr), 0.15 to 0.35 wt % of molybdenum (Mo), 0.25 to 0.40 wt % of manganese (Mn), 0.1 to 0.2 wt % of sulfur (S), and a remainder of iron (Fe) and inevitable impurities.

Alternatively, the sintered material may include 0.5 to 0.8 wt % of carbon (C), 0.8 to 0.9 wt % of molybdenum (Mo), 0.25 to 0.40 wt % of manganese (Mn), 0.1 to 0.2 wt % of sulfur (S), and a remainder of iron (Fe) and inevitable impurities.

The material of the upper body 110 may have the former composition, and the material of the lower body 120 may have the latter composition. However, the present invention is not limited thereto. For example, any one of the former composition and the latter composition may be used for both the upper body 110 and the lower body 120.

Carbon (C) is a key element of the steel material, and is added within the above-mentioned range to increase the strength and stabilize the bainite structure.

Chromium (Cr) is added within the above-mentioned range to stabilize a nitride layer and an oxide layer, which will be described later. When Cr is added in an amount less than 1.3 wt %, the hardness of a passive film layer, which will be described later, is lowered. When Cr is added in an amount greater than 1.7 wt %, the formability in the compression molding of the powder-type sintered material is lowered.

Molybdenum (Mo) is added within the above-mentioned range to improve the high-temperature strength through formation of carbide. When added with Cr, Mo is alloyed together with Cr. When Mo is alloyed together with Cr and when Mo is added in an amount less than 0.15 wt %, the high-temperature strength is lowered and the physical properties required of the engine piston cannot be attained, and when Mo is added in an amount greater than 0.35 wt %, the strength is excessively increased and powder molding becomes difficult. When Mo is used alone without Cr and when Mo is added in an amount less than 0.8 wt %, the high-temperature strength is lowered, and when Mo is added in an amount greater than 0.9 wt %, powder formability is lowered.

Manganese (Mn) and sulfur (S) form spherical MnS, and are added in a form of MnS powder to improve processability. When Mn and S are added in an amount less than a lower limit, processability may be lowered, and when Mn and S are added in an amount greater than an upper limit, strength may be lowered or a weak portion may be formed due to segregation of MnS.

In the bonding step, the above-described upper body 110 and lower body 120 are sintered and brazed to each other simultaneously. The upper body 110 and the lower body 120 are sintered by inserting a brazing material 200 between the upper body 110 and the lower body 120 and heating and pressing the same. At the instant time, the brazing material 200 partially penetrates the upper body 110 and the lower body 120, whereby the upper body 110 and the lower body 120 are integrally bonded to each other, resulting in formation of a single piston body 100.

The brazing material 200 may be formed in an annular shape. For example, the brazing material 200 may be formed in the shape of a washer, the top surface of which is in contact with the bottom surface of the upper body 110 and the bottom surface of which is in contact with the top surface of the lower body 120.

The brazing material 200 may include 35 to 45 wt % of Cu, 5 to 30 wt % of one or more selected from the group consisting of Si, Mn, B, P, C and Fe, and a remainder of Ni. When Ni is present in an amount greater than the above-mentioned range, the melting point is increased, and the amount of Cu diffused between the upper body 110 and the lower body 120 is decreased, whereby brazing is not properly achieved. When Cu is present in an amount greater than the above-mentioned range, the strength-increasing effect obtained by Ni is lowered, and the bonding strength of the brazed portion is thus lowered.

When the bonding step is performed, sintering and brazing are performed simultaneously while the upper body 110 and the lower body 120 are pressed at 1100 to 1170° C. for 20 to 40 minutes. After the sintering and brazing are completed, the upper body 110 and the lower body 120 are cooled to room temperature at a rate of 0.8 to 1.2° C./s, whereby the structure of the piston body 100 is transformed into bainite.

When the bonding step is performed, the upper body 110 and the lower body 120 may be spaced from each other by a gap of 0.05 to 0.15 mm. The gap may range from 0.06 to 0.12 mm. Due to the gap between the upper body 110 and the lower body 120, the brazing material 200 easily flows between the upper body 110 and the lower body 120 and is evenly diffused between the bonding surface of the upper body 110 and the bonding surface of the lower body 120.

When the gap is less than 0.05 mm, the space between the upper body 110 and the lower body 120 is so narrow that the brazing material 200 is not properly diffused. When the gap is greater than 0.15 mm, the brazing is not realized, or the bonding strength does not satisfy 350 MPa.

To allow the upper body 110 and the lower body 120 to be spaced from each other, upper protrusions 111 are formed on the bonding surface of the upper body 110, and lower protrusions 121 are formed on the bonding surface of the lower body 120. The upper body 110 and the lower body 120 are spaced from each other by bringing the upper protrusions 111 and the lower protrusions 121 into contact with each other. The number of the upper protrusions 111 and the number of the lower protrusions 121 may be the same, for example, three or more, to stably maintain the gap between the upper body 110 and the lower body 120. Since the upper protrusions 111 and the lower protrusions 121 are removed in the machining process, only the brazing material 200 is present between the upper body 110 and the lower body 120, which are bonded to each other.

As shown in FIG. 5, in the machining process, the surface of the piston body 100 is machined to a predetermined machining depth 101 to remove pores P from the surface.

Described in detail, when the surface of the piston body 100 is machined, a pore P formed in the surface while having a size less than the machining depth 101 is completely removed. In the case of a pore P formed in the surface while having a size greater than the machining depth 101, a portion of the surface of the piston body 100 around the pore P is introduced into the pore P, with the result that the entire surface of the piston body 100 is flattened.

The machining depth 101 may range from 0.1 to 0.2 mm. When the machining depth 101 is less than 0.1 mm, it is difficult to remove pores P from the surface of the piston body 100. On the other hand, when the machining depth 101 is greater than 0.2 mm, the effect of removing pores from the surface of the piston body 100 is not improved Furthermore, machining costs are increased due to excessive machining, and the upper body 110 and the lower body 120 need to be increased in size, thus incurring an increase in material costs.

Through the present surface-machining step, the surface of the piston body 100 is flattened by removing pores P from the surface of the piston body 100 or blocking pores P formed in the surface of the piston body 100. However, pores P formed inside the piston body 100 are not removed, but serve as thermal insulation layers when the piston body 100 operates as an engine piston.

After the machining process, the density of the piston body 100 may range from 6.9 to 7.3 g/cm$^3$, and the internal porosity of the piston body 100 may range from 7.5 to 12%.

When the density is less than the above-mentioned range or when the internal porosity is greater than the above-mentioned range, the thermal insulation performance is improved, and the temperature of the piston head portion is therefore increased, improving the fuel efficiency of the diesel engine. However, the brittleness is increased and the lifespan is shortened. When the density is greater than the above-mentioned range or when the internal porosity is less than the above-mentioned range, the thermal insulation performance deteriorates, and it is therefore difficult to sufficiently raise the temperature of the piston head portion.

As shown in FIG. 6 and FIG. 7, in the heat treatment step, a passive film 130 is formed by performing at least one of nitriding heat treatment or oxidation heat treatment on the surface of the piston body 100.

At the instant time, the detailed configuration of the passive film 130 may vary depending on the heat treatment method.

As shown in FIG. 6, when only steam heat treatment is performed, the passive film 130 may be configured as a first oxide layer 131, which includes $Fe_3O_4$ and is formed to have a thickness of 2 to 8 μm on the surface of the piston body 100.

To form the first oxide layer 131 on the surface of the piston body 100, the oxidation heat treatment is performed at 540 to 570° C. for 20 to 120 minutes in a steam atmosphere.

Since $Fe_3O_4$ is a porous material and has excellent thermal insulation property, it may help raise the temperature of the head portion of the piston body 100. Furthermore, as described above, since the piston body 100 according to an exemplary embodiment of the present invention includes chromium, $Cr_2O_3$ may be additionally formed in the first oxide layer 131 through the steam heat treatment, improving the oxidation resistance of the surface of the piston body 100.

As shown in FIG. 7, when the nitriding heat treatment and the steam heat treatment are performed simultaneously, the passive film 130 may be formed to include a nitride layer 132, which includes iron nitride and is formed to have a thickness of 4 to 20 μm on the surface of the piston body 100, and a second oxide layer 133, which includes $Fe_3O_4$ and is formed to have a thickness of 1 to 3 μm on the surface of the nitride layer 132.

At the instant time, the heat treatment is performed at 450 to 540° C. for 1 to 4 hours in an ammonia ($NH_3$) atmosphere to form the nitride layer 132 including more than 50% of $Fe_{2-3}N$ and a remainder of $Fe_4N$. Subsequently, the heat treatment is performed at 540 to 570° C. for 20 to 120 minutes in a steam atmosphere to form the second oxide layer 133 including $Fe_3O_4$.

When the nitride layer 132 is formed, an ion-nitriding method or a gas-nitrocarburizing method may be used, and the porous nitride formed in the present manner may improve the thermal insulation property of the piston body 100. Furthermore, after the nitriding heat treatment, the oxidation heat treatment may be performed in a steam atmosphere, improving the high-temperature fatigue strength of the piston body 100.

A dense layer having a dense structure is formed at a portion of the nitride layer 132 which is relatively close to the surface of the piston body 100, and a porous layer including pores is formed on the dense layer. The dense layer may be formed to have a thickness of 2 μm or more, and the porous layer may be formed to have a thickness of 10 μm or less. The porous layer is configured to improve the thermal insulation property of the piston body 100, and the dense layer is configured to prevent oxidation of the piston body 100 by preventing permeation of oxygen.

Alternatively, the passive film 130 may be formed using only the nitride layer 132 without the second oxide layer 133. In the instant case, the oxidation heat treatment is not performed after the nitriding heat treatment.

To transform the piston body 100 shown in FIG. 3, which has undergone the bonding step, into the final piston product 100a shown in FIG. 4, additional machining may be performed.

This additional machining is performed to form an insertion groove, into which a piston ring is inserted, a pin hole, into which a connecting rod is fastened, and an oil gallery, in which a lubricant is stored.

This additional machining may be performed after the bonding step and before the machining step.

The engine piston according to an exemplary embodiment of the present invention includes a piston body 100, which is formed by sintering an upper body 110 and a lower body 120, formed through powder compression molding, bonding the upper body 110 and the lower body 120 to each other using a brazing material 200 simultaneously with the sintering, and machining the surface thereof to remove pores from the surface thereof, and a passive film 130, which is formed on the surface of the piston body 100 and includes at least one of oxide or nitride.

Such an engine piston is manufactured by the above-described engine piston manufacturing method, and the description of the concrete configuration thereof is substituted by the description of the engine piston manufacturing method.

The engine piston manufactured according to the above-described manufacturing method has a compression height (the distance from the top surface of the piston to the piston pin) of 25 to 40 mm, which is shorter than the compression height of a conventional piston made of Al by about 25%.

As is apparent from the above description, an engine piston and a method of manufacturing the same according to an exemplary embodiment of the present invention have the following effects.

First, since the thermal conductivity is low, heat generated during fuel combustion accumulates in a piston head portion, raising the temperature of the piston head portion and consequently improving the combustion efficiency of the diesel engine.

Second, since oxidation resistance is excellent, it is possible to prevent the occurrence of cracks at high temperatures.

Third, since sintering and brazing are performed simultaneously, the manufacturing process is simplified.

Although exemplary embodiments of the present invention have been described for illustrative purposes, those skilled in the art will appreciate that various modifications, additions and substitutions are possible, without departing from the scope and spirit of the present invention as included in the accompanying claims.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of manufacturing an engine piston, the method comprising:
    performing upper-body formation of forming an upper body as an upper portion of a piston body in the engine piston by pressing a powder-type sintered material;
    performing lower-body formation of forming a lower body as a lower portion of the piston body in the engine piston by pressing a powder-type sintered material;
    performing bonding of forming the piston body by providing a brazing material between the upper body and the lower body and brazing the upper body and the lower body to each other while simultaneously sintering and bonding a sintered material;
    performing machining of removing pores from a surface of the piston body by machining the surface of the piston body; and
    performing heat treatment of forming a passive film by performing at least one of nitriding heat treatment or oxidation heat treatment on the surface of the piston body.

2. The method according to claim 1, wherein in the performing the heat treatment, the oxidation heat treatment is performed after the nitriding heat treatment is performed on the surface of the piston body.

3. The method according to claim 1, wherein the sintered material comprises 0.45 to 0.6 wt % of C, 1.3 to 1.7 wt % of Cr, 0.15 to 0.35 wt % of Mo, 0.25 to 0.40 wt % of Mn, 0.1 to 0.2 wt % of S, and a remainder of Fe and inevitable impurities.

4. The method according to claim 1, wherein the sintered material comprises 0.5 to 0.8 wt % of C, 0.8 to 0.9 wt % of Mo, 0.25 to 0.40 wt % of Mn, 0.1 to 0.2 wt % of S, and a remainder of Fe and inevitable impurities.

5. The method according to claim 1, wherein the brazing material used in the performing the bonding comprises 35 to 45 wt % of Cu, 5 to 30 wt % of one or more selected from the group consisting of Si, Mn, B, P, C and Fe, and a remainder of Ni.

6. The method according to claim 1, wherein in the performing the bonding, the brazing of the upper body and the lower body to each other and the sintering of the sintered material are performed at 1100 to 1170° C. for 20 to 40 minutes, and after the brazing of the upper body and the lower body to each other and the sintering of the sintered material are completed, the upper body and the lower body are cooled to room temperature at a rate of 0.8 to 1.2° C./s.

7. The method according to claim 1, wherein in the performing the bonding, the upper body and the lower body are spaced from each other by a gap of 0.05 to 0.15 mm, and the brazing material is provided between the upper body and the lower body.

8. The method according to claim 1, wherein at least a protrusion is formed on a bonding surface of at least one of the upper body and the lower body to form the gap between the upper body and the lower body.

9. The method according to claim 1, wherein in the performing the machining, the surface of the piston body is milled to a depth of 0.1 to 0.2 mm from the surface of the piston body.

10. The method according to claim 1,
    wherein in the performing the heat treatment, the passive film is formed by performing oxidation heat treatment at 540 to 570° C. for 20 to 120 minutes, and
    wherein the passive film comprises a first oxide layer comprising $Fe_3O_4$, the first oxide layer being formed to have a thickness of 2 to 8 μm on the surface of the piston body.

11. The method according to claim 1,
    wherein in the performing the heat treatment, a nitride layer is formed by performing the nitriding heat treatment at 450 to 540° C. for 1 to 4 hours, and the passive film is formed by performing the oxidation heat treatment at 540 to 570° C., and
    wherein the passive film comprises the nitride layer comprising iron nitride, the nitride layer being formed to have a thickness of 4 to 20 μm on the surface of the piston body, and a second oxide layer comprising $Fe_3O_4$, the second oxide layer being formed to have a thickness of 1 to 3 μm on an upper surface of the nitride layer.

* * * * *